(12) United States Patent
Rotti et al.

(10) Patent No.: US 12,283,023 B1
(45) Date of Patent: Apr. 22, 2025

(54) NEURAL NETWORKS FOR HIGH DYNAMIC RANGE VIDEO SUPER-RESOLUTION

(71) Applicant: Dolby Laboratories Licensing Corporation, San Francisco, CA (US)

(72) Inventors: Shruthi Suresh Rotti, Mountain House, CA (US); Anustup Kumar Atanu Choudhury, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/846,430

(22) PCT Filed: Mar. 17, 2023

(86) PCT No.: PCT/US2023/064624
§ 371 (c)(1),
(2) Date: Sep. 12, 2024

(87) PCT Pub. No.: WO2023/183756
PCT Pub. Date: Sep. 28, 2023

Related U.S. Application Data

(60) Provisional application No. 63/323,348, filed on Mar. 24, 2022.

(30) Foreign Application Priority Data

Apr. 22, 2022 (EP) .................................. 22169403

(51) Int. Cl.
*G06T 3/40* (2024.01)
*G06T 3/4046* (2024.01)
*G06T 3/4053* (2024.01)

(52) U.S. Cl.
CPC .......... *G06T 3/4046* (2013.01); *G06T 3/4053* (2013.01)

(58) Field of Classification Search
CPC ....... G06T 3/40; G06T 3/4046; G06T 3/4053; H04N 19/59; H04N 19/537
(Continued)

(56) References Cited

U.S. PATENT DOCUMENTS 8,537,278 B1 9/2013 Bozinovic
9,098,906 B2 8/2015 Bruls
(Continued)

OTHER PUBLICATIONS

Francois, E., et al., High Dynamic range Video Coding Technology in Responses to the Joint Call for Proposals on Video Compression With Capability Beyond HEVC, IEEE Transactions on Circuits and Systems for Video Technology, vol. 30, No. 5, May 2020, p. 1253-1266, 14 pages.
(Continued)

*Primary Examiner* — Trang U Tran (57) ABSTRACT

Methods and systems for the super resolution of high dynamic range (HDR) video are described. Given a sequence of video frames, a current frame and two or more neighboring frames are processed by a neural-network (NN) feature extraction module, followed by a NN upscaling module, and a NN reconstruction module. In parallel, the current frame is upscaled using traditional up-sampling to generate an intermediate up-sampled frame. The output of the reconstruction module is added to the intermediate up-sampled frame to generate an output frame. Additional
(Continued)

traditional up-sampling may be performed on the output frame to match the desired up-scaling factor, beyond the up-scaling factor for which the neural network was trained.

15 Claims, 4 Drawing Sheets

(58) Field of Classification Search
USPC .......................................................... 348/441
See application file for complete search history.

(56) References Cited

U.S. PATENT DOCUMENTS

| | | | |
|---|---|---|---|
| 9,378,543 B2 | 6/2016 | Aydin | |
| 10,341,574 B2 | 7/2019 | Cote | |
| 10,572,976 B2 | 2/2020 | Albrecht | |
| 10,880,551 B2 | 12/2020 | Topiwala | |
| 10,885,608 B2* | 1/2021 | Zhang | G06T 3/4046 |
| 10,984,758 B1 | 4/2021 | Croxford | |
| 11,252,300 B2* | 2/2022 | Zhu | G06F 18/214 |
| 11,288,771 B2* | 3/2022 | Zhang | G06T 3/4053 |
| 11,544,815 B2* | 1/2023 | Potapov | G06T 3/4046 |
| 11,967,044 B2* | 4/2024 | Song | G06T 3/4046 |
| 2021/0397846 A1 | 12/2021 | Chang | |
| 2022/0030260 A1 | 1/2022 | Park | |
| 2022/0237739 A1* | 7/2022 | Li | G06T 1/20 |

OTHER PUBLICATIONS

Fuoli, D., et al., AIM 2020 Challenge on Video Extreme Super-Resolution: Methods and Results, XP081762407, Sep. 14, 2020, 24 pages.

Haris, M., et al., Deep Back-Projection Networks For Super-Resolution, 2018 IEEE.CVF Conference on Computer Vision and Pattern Recognition, XP033476130, p. 1664-1673, Jun. 18, 2018, 10 pages.

Haris, M., et al., Recurrent Back-Projection Network for Video Super-Resolution, Proceedings of the IEEE/CVF Conference on Computer Vision and Pattern Recognition, arxiv: 1903.10128, Mar. 25, 2019, 13 pages.

ITU-R Report BT 2390-0, "High Dynamic Range Television for Production and International Programme Exchange" Mar. 2017, 45 pages.

Shi, W., et al., Real-Time Single Image and Video Super-Resolution Using an Efficient Sub-Pixel Convolutional Neural Network, Proceedings of the IEEE/CVF International Conference on Computer Vision, arXIV: 1609.05158, Sep. 26, 2016, 10 pages.

Soh, J. W., et al., Joint High Dynamic Range Imaging and Super-Resolution From a Single Image, IEEE Access, vol. 7, Dec. 23, 2019, p. 177427-177437, 11 pages.

Yi, P., et al., Progressive Fusion Video Super-Resolution Network via Exploiting Non-Local Spatio-Temporal Correlations, 2019 IEEE/CVF International Conference on Computer Vision (ICCV), XP033723451, p. 3106-3115, Oct. 7, 2019, 10 pages.

* cited by examiner

FIG. 7

NEURAL NETWORKS FOR HIGH DYNAMIC RANGE VIDEO SUPER-RESOLUTION

CROSS-REFERENCE TO RELATED APPLICATIONS

This application is a U.S. National Stage application under U.S.C. 371 of International Application No. PCT/US2023/064624, filed on Mar. 17, 2023, which claims the benefit of priority of the following priority applications: U.S. Provisional Patent Application No. 63/323,348, filed 24 Mar. 2022, and European Patent Application No. 22169403.7, filed on 22 Apr. 2022, each one included by reference in its entirety.

TECHNOLOGY

The present invention relates generally to images. More particularly, an embodiment of the present invention relates to techniques for super-resolution for high dynamic range video content.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

As used herein, the term "super-resolution" refers to modifying the spatial resolution of a sequence of video pictures while preserving picture details and motion consistency.

The creation and play back of high dynamic range (HDR) content is now becoming widespread as HDR technology offers more realistic and lifelike images than earlier formats. However, the broadcast infrastructure may not support the transmission of HDR content in full resolution. To improve existing coding schemes, as appreciated by the inventors here, improved techniques for the super-resolution of HDR images are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods for the super resolution of HDR video are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Figure 1:
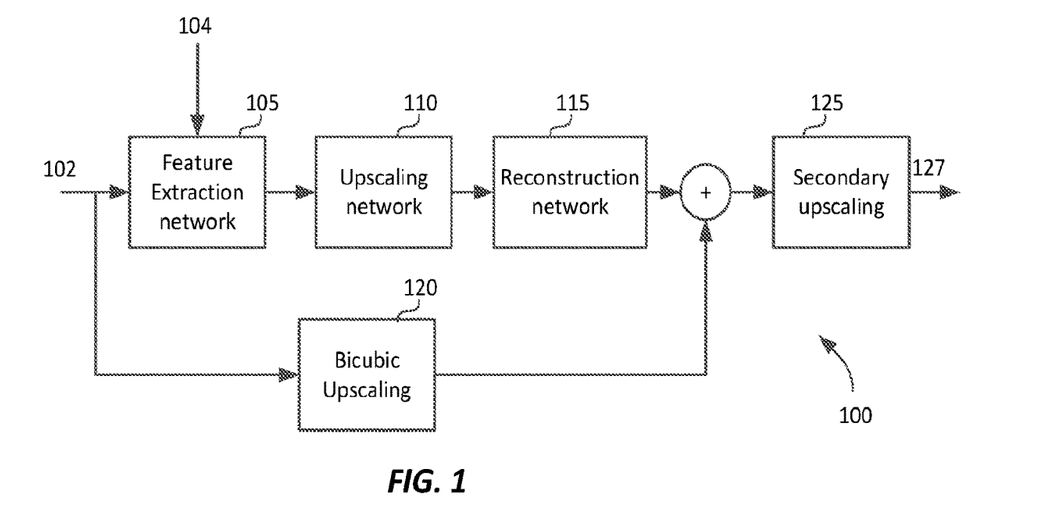
FIG. 1 depicts an example process for super-resolution of HDR video according to an example embodiment of the present invention.

Example embodiments described herein relate to methods for super-resolution of HDR video. In an embodiment, a processor receives at a first spatial resolution a current picture (102) and auxiliary pictures (104) in close proximity to the current picture.

The processor: generates a neural network (NN) features output based on a features extraction neural network (105), the current picture (102) and the auxiliary pictures (104), generates a NN upscaling output at a second spatial resolution based on the NN features output and an upscaling neural network (110), generates a NN reconstruction output at the second spatial resolution based on the NN upscaling output and a reconstruction neural network (115), upscales the current picture with a first picture scaler to generate a first upscaled picture at the second spatial resolution, and adds the first upscaled picture to the NN reconstruction output to generate a super-resolution picture at the second spatial resolution.

Super Resolution Pipeline

In recent years, super-resolution techniques (Ref. [1-2]) have been proposed as a way to improve coding efficiency in image and video coding. For example, instead of compressing images at full resolution, an encoder could downsample input frames at a lower resolution, compress them using known coding techniques (e.g., AVC, HEVC, AV1, and the like), and then allow a decoder to reconstruct the decoded frames at the desired resolution. Upscaling and downscaling modules are also quite common in graphics and display management to adapt the resolution of incoming video to the resolution of a target display. On the content creation side, super-resolution modules as proposed herein can be used to merge content that is available at varying resolution levels, while maintaining the best possible perceived image quality.

While example embodiments described herein may refer specifically to upscaling, the proposed modules, with proper training, and by replacing up-scaling units with down-scaling units, are applicable to down-sampling as well.

FIG. 1 depicts an example super-resolution pipeline (100) for HDR images according to an embodiment. As depicted in FIG. 1, pipeline 100 includes the following modules or components:

a neural networks feature extraction module (105)
a neural networks upscaling module (110)
a neural networks reconstruction module (115)
a traditional (e.g., bicubic) upscaling module (120); and
an optional traditional secondary up-scaling module (125)

The main purpose of this pipeline is to change the spatial resolution of incoming HDR video (102, 104) while maintaining spatio-temporal consistency. Input to this pipeline are a current frame (102) and multiple neighboring frames (104) to the current frame (prior or subsequent to the current frame). The intention of using neighbor frames (104) in the pipeline is to better capture the temporal details so that one can ensure maintaining spatio-temporal consistencies during the upscaling process. For example, without limitation, system 100 can receive three consecutive frames, the current frame f(t), previous frame f(t−1), and the subsequent frame f(t+1), each of size (H, W), where H denotes the height of the image and W is the width of the image. The system will construct a scaled version of the current frame of size (s*H, s*W) where s is the resizing scale. In an embodiment, the pipeline is formed out of neural-network (NN) blocks trained to work with HDR images coded using perceptual quantization (PQ) in the ICtCp color space as defined in Rec. BT. 2390, "*High dynamic range television for production and international programme exchange.*" The ICtCp space is preferred due to being a perceptually uniform color space, thus improving spatio-temporal consistency.

Subdividing process 100 into modules allows for a more efficient handling of each task. The feature extraction block (105) extracts the features from the input using of series of convolution operations followed by a non-linear activation function. Here, features extracted from multiple consecutive frames are concatenated to achieve spatio-temporal consistencies. The spatial resolution of the input is maintained, therefore the feature extraction happens in a lower resolution space and computation is faster. Features are extracted adaptively by the network as it tries to improve upscaling as compared to using a traditional upscaling method (e.g., bicubic upscaling 120).

Once the features are extracted, they are sent to an upscaling module (110) where the filter operation results in increasing the spatial resolution of the extracted features. In an embodiment, up-scaling is fixed to 4× (s=4). In a system, other scaling factors can be enabled using the secondary upscaling block (125). The reconstruction module (115) brings the number of channels of the features to match the number of channels of the output. As discussed earlier, the bicubic upscaling block (120) is added to allow the full network to undergo residual learning as it tries to extract features to improve upon the traditional upscaling. Finally, a secondary upscaling module (125) allows as system to achieve arbitrary upscaling, so output 127 reaches the desired target resolution, beyond the upscaling (e.g., s) for which the neural-network part of the pipeline was trained.

In an embodiment, a neural network may be defined as a set of 4-dimensional convolutions, each of which is followed by adding a constant bias value to all results. In some layers, the convolution is followed by clamping negative values to 0. The convolutions are defined by their size in pixels (M×N), how many image channels (C) they operate on, and how many such kernels are in the filter bank (K). In that sense, each convolution can be described by the size of the filter bank C×K×M×N. As an example, a filter bank of the size 1×2×3×3 is composed of 2 convolution kernels, each of which operates on one channel, and has a size of 3 pixels by 3 pixels.

Some filter banks may also have a stride, meaning that some results of the convolution are discarded. A stride of 1 means every input pixel produces an output pixel. A stride of 2 means that only every second pixel in each dimension produces an output, and the like. Thus, a filter bank with a stride of 2 will produce an output with (M/2)×(N/2) pixels, where M×N is the input image size. If padding=1, all inputs except the ones to fully connected kernels are padded so that setting the stride of 1 would produce an output with the same number of pixels as the input. The output of each convolution bank feeds as an input into the next convolution layer.

The Feature Extraction Module

Figure 2:
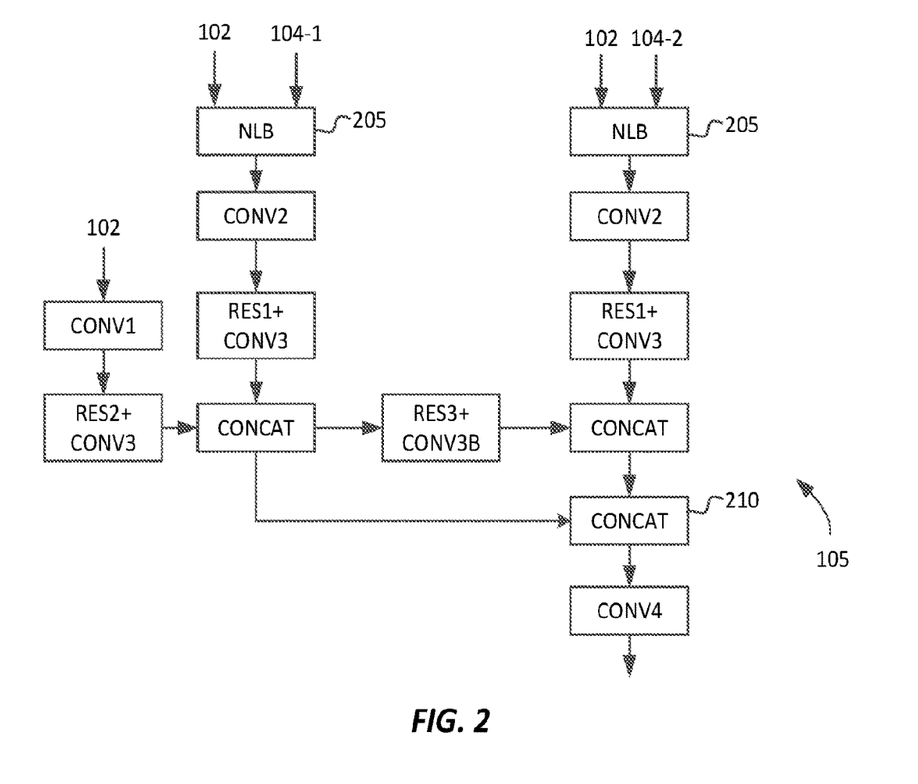
FIG. 2 depicts an example architecture of a neural-network for a feature extraction module according to an example embodiment of the present invention.

FIG. 2 depicts an example architecture of a neural-network for the feature extraction module (105). The feature extraction module has convolutional (CONV) blocks, Residual Network (RESNET) blocks, Non Local Blocks (NLB), and ReLU rectifier blocks which extract the features of the input. More specifically, in an embodiment, the convolutional blocks are configured as:

CONV1: 3×256×3×3, stride=1, padding: 1, activation PreLu (parametric ReLU)

CONV2: 6×256×3×3, stride=1, padding: 1, activation PreLu.

CONV3: 256×32×3×3, stride=1, padding: 1, activation PreLu.

CONV3B: 64×256×3×3, stride=1, padding: 1, activation PreLu.

CONV4: 64×3×3×3, stride=1, padding: 1

Figure 3:
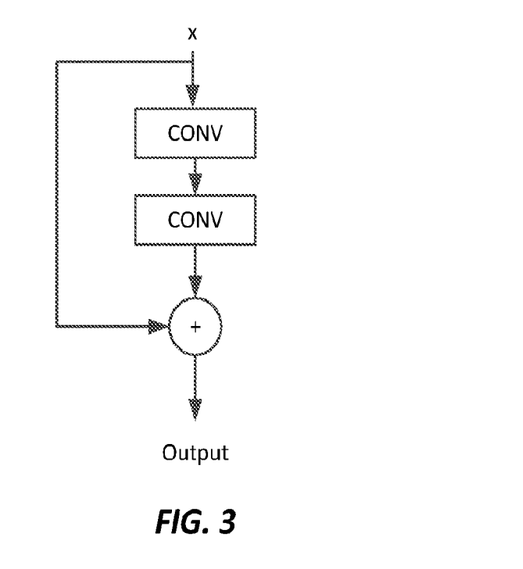
FIG. 3 depicts an example RES unit used in residual networks in example embodiments of the present invention.

Each RESNET block in FIG. 2 (e.g., RES1, RES2, and RES3) comprises five smaller, and concatenated, Res units. Each of these Res units comprises two CONV layers, as depicted in FIG. 3. RES1 and RES2 have convolutional layers (CONV) with filters 256×64×3×3, stride=1, padding: 1, activation PreLu. RES3 has convolutional layers (CONV) with filters 64×64×3×3, padding: 1, activation PreLu.

Figure 6:
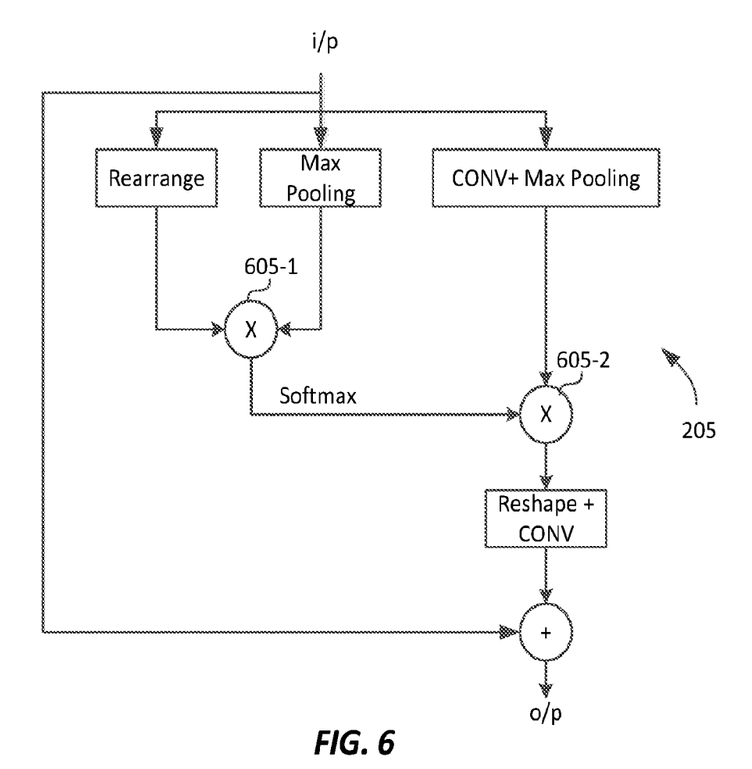
FIG. 6 depicts a processing pipeline of a non-local-block (NLB)

FIG. 6 depicts an example embodiment of the Non-Local Residual Block (NLB) unit (205). NLBs were first introduced in Ref. [1] and are used to capture long-range dependencies without the need to use motion estimation and compensation. The input i/p denotes that the input frame and the auxiliary frames are concatenated along the column axis or the channel direction. For example, let a picture be of size (3, W, H), where 3 denotes the number of color channels, W=width, and H=height. When two such pictures are concatenated in the channel direction, then the combined picture is of size (6, W, H). For example, when having three consecutive frames f(t−1), f(t), and f(t+1), one of the NLBs processes f(t) (102) and f(t−1) (104-1), and the other NLB processes f(t) (102) and f(t+1) (104-2).

Accordingly, the NLB unit 205 as shown comprises a first path, a second path, a third path and a residual path. The first path comprises a first reshaping block (Rearrange). The first reshaping block outputs a first feature map. The second path comprises a first pooling layer, such as a max pooling layer, and outputs a second feature map. The second feature map thus represents a pooled or down-sampled feature map. The third path comprises a sequence of a first convolution block (CONV) and a second pooling layer (e.g. a second max pooling layer) and outputs a third feature map. While not shown in FIG. 6, this third feature map may go through a third reshaping block such that the output of the third path is formed by the reshaped third feature map. First and second multipliers 605-1 and 605-2 (which may be commonly designated by reference sign 605) denote matrix multiplication, and the adder denotes an element-wise add. The first multiplier 605-1 performs matrix multiplication of the first feature map and the second feature map and outputs a fourth feature map. The fourth feature map is fed to an activation function (e.g. softmax). The second multiplier 605-2 performs matrix multiplication of the output of the activation function and the (reshaped) third feature map and outputs a fifth feature map. The fifth feature map is fed through a sequence of a second reshaping block and a second convolution block (Reshape+CONV) processing the fifth feature map and outputting a sixth feature map. The adder performs element-wise addition of the sixth feature map and the input received via the residual path. The output of the adder is fed towards the output of the NLB unit 205. Given the need to perform matrix multiplication (605) and element-wise addition, the Rearrange and Reshape block (i.e. the first and second reshaping blocks) and (if present) the third reshaping block perform the proper data transformations (i.e. reshaping) before or after the multiplications. For instance, the first reshaping block reshapes its input such that the (reshaped) first feature map output by the first reshaping block may be multiplied with the (pooled) second feature map output by the first pooling layer. The third reshaping block reshapes its input (the third feature map) such that the reshaped third feature map output by the third reshaping block may be multiplied with the output of the activation function. The second reshaping block reshapes its input (the fifth feature map) such that, following the processing by the second convolution block, the sixth feature map may be added in an element-wise fashion to the concatenated pictures at the adder. The reshaping provided by the first, second and third reshaping blocks is provided by rearranging the elements of their respective inputs into the proper format without any down-sampling of the respective feature maps. It may be noted that the first, second, third, fourth and fifth feature maps each are two-dimensional and thus may be represented in matrix form. The second convolution block following the second reshaping block may increase (e.g. by feature projection) the number of dimensions of the output of the second reshaping block to three, such that the sixth feature map and the concatenated pictures have corresponding dimensions (and thus may be added in an element-wise fashion). In other words, the second convolution block may increase the depth (i.e. number of channels) of the feature map received from the second reshaping block such that the depth of the sixth feature map matches the depth of the input received via the residual path.

In the NLB, after concatenation, but before any other NLB processing, the input may be reshaped using a "space-to-depth" transformation to reduce the number of computations. The space-to-depth may be achieved by a sub-pixel convolution layer as described in Ref. [3]. As explained earlier, given the combined picture of size (6, W, H), in an embodiment, the number of channels is increased by a factor of 4, while each spatial dimension (W,H) is reduced by a factor of 2, resulting in a combined input of ($6*2^2$, H/2, W/2). The two CONV blocks in the NLB are 24×24×1×1, stride=1, padding=0, where 24 is 4×6, as derived earlier, e.g. with PreLu activation. This space-to-depth operation is reversed after the NLB. More generally, given a concatenated picture of size (2*C, W, H), a space-to-depth transformation may increase the number of channels to $2*C*r^2$ and reduce the spatial dimensions to width W/r and height H/r. In this case the two CONV blocks in the NLB may be A×B×1×1, stride=1, padding=0, where $A=B=2*C*r^2$ (e.g. with PreLu activation).

Returning to FIG. 2, the combination of CONV and RESNET blocks followed by the ReLu activation after every block helps in capturing the key features of the frames in separate paths: the current picture alone, and the current picture with a separate auxiliary (neighbor) picture. The feature extraction block recursively extracts features by taking the current frame and the neighbor consecutive frames and concatenating their features in the last dimension. At the end of the feature extraction block, the recursively extracted features from all three paths are concatenated (210). The last convolutional network, CONV4, is defined as 64×3×3×3, stride=1, padding=1. The sequence of RES3+CONV3B in FIG. 2 may be referred to as a convolutional sub-network of the features extraction NN 105 and may more generally comprise at least one convolutional block.

The concatenated features capture the temporal relationship between these frames. In some videos that have faster motion, the NLB block provides additional help by capturing long distance dependencies. These two ways of capturing inter-frame temporal information eliminates the need for optical flow. The proposed architecture of handling motion does not require an explicit estimation and compensation block. The output of the feature extraction block is fed to the upscaling module (110), which will increase the spatial resolution of these features.

The Upscaling Module

Figure 4:
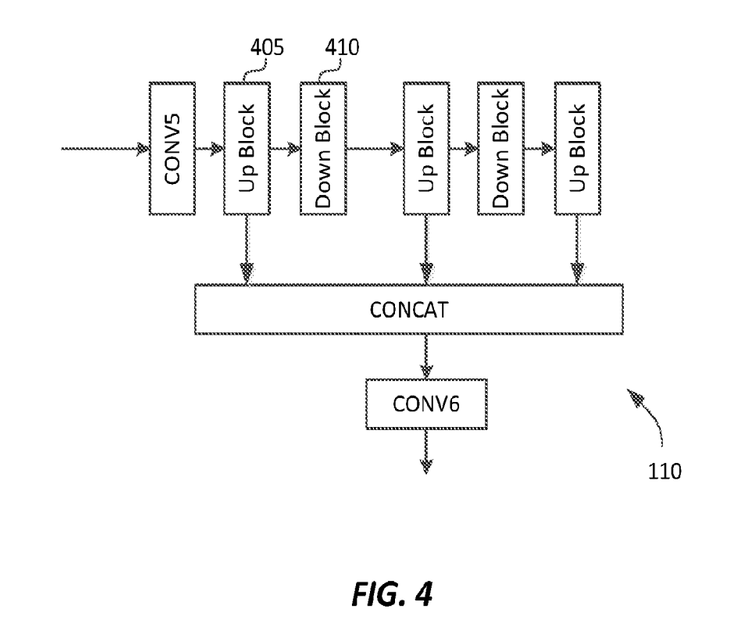
FIG. 4 depicts an example neural-network architecture for an up-scaling module according to an example embodiment of the present invention.

FIG. 4 depicts an example embodiment of the upscaling module (110). It consists of a series of CONV, Up Block, and Down Block modules defined as follows:

CONV5: 256×64×1×1, stride=1, padding=0
CONV6: 192×64×1×1, stride=1, padding=0

Figure 7:
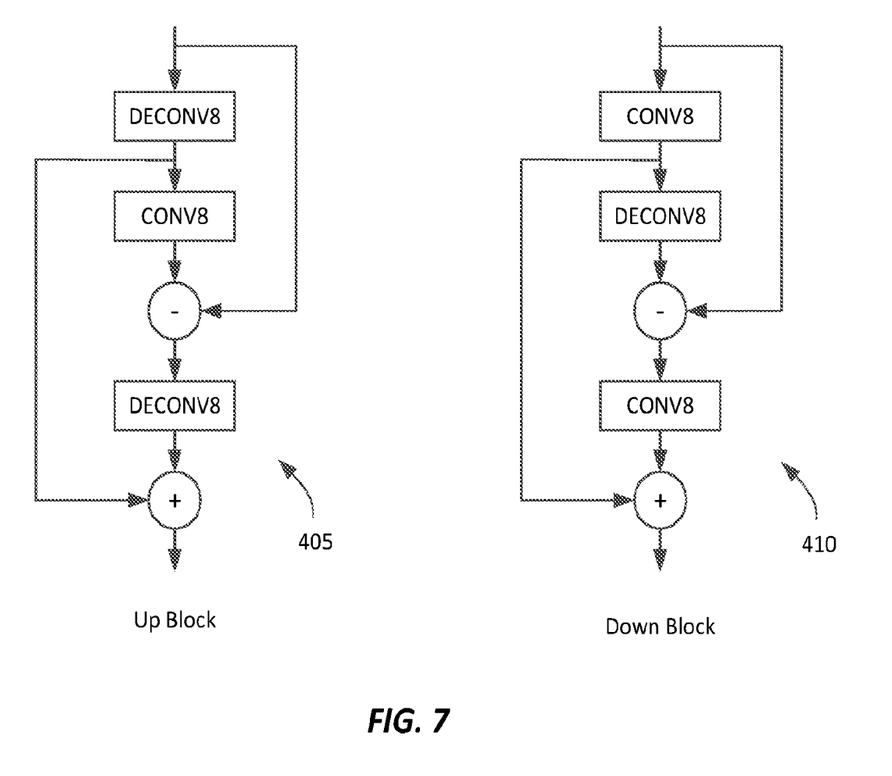
FIG. 7 depicts a processing Up Block and a processing Down Block for the up-scaling module depicted in FIG. 4.

Examples of the Up Block (405) and Down Block (410) modules are depicted in FIG. 7, where the convolution and deconvolution modules are defined as:

CONV8: 64×64×8×8, stride=4, padding=2
DECONV8: 64×64×8×8, stride=4, padding=2

The "Up Block" module (405) increases the spatial resolution of the input. The "Down Block" module (410) reduces the spatial resolution of the input. As depicted in FIG. 4, the upscale module includes alternating Up blocks and Down blocks. This alternating up-down series yields a better representation of the low resolution to high resolution mapping.

Compared to other super-resolution architectures (e.g., Ref. [2]), the separation of the features extraction block and the upscaling block into two distinct neural networks allows this architecture to perform all feature extraction-related operations in the low resolution, thus improving computational performance over other techniques where many operations are performed at the high resolution.

The Reconstruction Module

Figure 5:
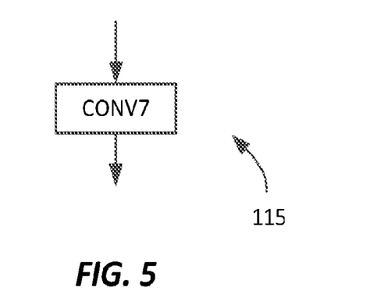
FIG. 5 depicts an example neural-network architecture for a reconstruction module according to an example embodiment of the present invention.

FIG. 5 depicts an example embodiment of the reconstruction block which is used to reduce the depth of the features received from the upscaling module to match the number of output channels. The reconstruction module has a single convolution block (CONV7) defined as 64×3×3×3, stride=1, padding=1, which is used to reduce the feature depth to match the number of channels of the current frame. The output of this module will be added to the up-scaled input frame using traditional up-scaling (120) (e.g., bilinear, bicubic, Sinc and Lancsos resampling, and the like).

The Secondary Upscaling Module

This module (127) is used to increase the spatial resolution of the output of the network to an arbitrary scaling factor, beyond the scaling factor(s) for which the rest of the super-resolution NN is trained. For example, if the network is trained to achieve 4× (s=4) upscaling and the desired upscale factor is 6, one can achieve the remaining upscaling (3/2) using this block. In an embodiment, without limitation, this block applies bicubic upscaling as well.

In another embodiment, one can train multiple super-resolution networks (100) at different scaling factors and apply them in tandem to achieve the desired scaling factor.

In an embodiment, the full network (100) is trained using HDR images encoded with a PQ nonlinear input function in the ICtCp color space. This helps in handling the upscaling of HDR images correctly. During training, the loss is calculated using L1 loss in the ICtCp space. It was noticed that training the images in the ICtCp space worked better for HDR images as compared to using RGB color space, which is the norm for Super Resolution applications.

More generally, the super-resolution pipeline as described above may be trained using a training set of down-sampled images (e.g. HDR images) generated by down-sampling pictures or frames of a reference set of videos by a factor (e.g. 4) corresponding to the desired degree of upscaling to be provided by the super-resolution pipeline. The super-resolution pipeline may for instance be trained in an end-to-end training approach using conventional backpropagation algorithms to minimize an error between the up-scaled pictures and the corresponding reference pictures.

REFERENCES

Each of these references is include by reference in their entirety.

[1] P. Yi, et al., "Progressive fusion super-resolution network via exploiting non-local spatio-temporal correlations," *Proceedings of the IEEE/CVF International Conference on Computer Vision.* 2019.

[2] M. Haris, G. Shakhnarovich, and N. Ukita. "Recurrent back-projection network for video super-resolution." *Proceedings of the IEEE/CVF Conference on Computer Vision and Pattern Recognition.* 2019.

[3] S. Wenzhe, et al., "Real-time single image and video super-resolution using an efficient sub-pixel convolutional neural network." *IEEE Conference on Computer Vision and Pattern Recognition (CVPR)*, pages 1874-1883, 2016.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations, such as those described herein. The computer and/or IC may compute any of a variety of parameters or values that relate to super resolution of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to super resolution of HDR video as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to super resolution of HDR video are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Example Embodiments

Hereafter follows a listing of enumerated example embodiments ("EEEs") of the present invention:

EEE 1. A method for super-resolution of pictures in a video sequence:
  receiving at a first spatial resolution a current picture (102) and auxiliary pictures (104) in close proximity to the current picture:
    generating a neural network (NN) features output based on a features extraction neural network (105), the current picture (102) and the auxiliary pictures (104);
  generating a NN upscaling output at a second spatial resolution based on the NN features output and an upscaling neural network (110);
  generating a NN reconstruction output at the second spatial resolution based on the NN upscaling output and a reconstruction neural network (115);
  upscaling the current picture with a first picture scaler to generate a first upscaled picture at the second spatial resolution; and
  adding the first upscaled picture to the NN reconstruction output to generate a super-resolution picture at the second spatial resolution.

EEE 2. The method of EEE 1, further comprising applying to the super-resolution picture a second spatial upscaling to generate a second super-resolution picture at a third spatial resolution.

EEE 3. The method of EEE 2, wherein the second spatial upscaling comprises bicubic upscaling.

EEE 4. The method of any of the preceding EEEs, wherein the first picture scaler comprises bicubic upscaling.

EEE 5. The method of any of the preceding EEEs, wherein the auxiliary pictures comprise one or more pictures prior to the current picture.

EEE 6. The method of any of the EEEs 1 to 4, wherein the auxiliary pictures comprise one or more pictures subsequent to the current picture.

EEE 7. The method of any of the preceding EEEs, wherein the auxiliary pictures comprise one or more pictures subsequent to the current picture and one or more pictures prior to the current picture.

EEE 8. The method of any of the preceding EEEs, wherein the current picture and the auxiliary pictures are HDR pictures coded using PQ in the ICtCp color space.

EEE 9. The method of any of the preceding EEEs, wherein the upscaling neural network comprises an input feeding into an input convolution block (CONV5) followed by a first Up Block and a first Down block, followed by a second Up Block and a second Down block, followed by a third Up Block, wherein outputs from all the Up Blocks are concatenated to generate an output which is fed to an output convolution block (CONV6) to generate an upscaled output of the input.

EEE 10. The method of any of the preceding EEEs, wherein the reconstruction neural network comprises a convolutional module.

EEE 11. The method of any of the preceding EEEs, wherein the features extraction network comprises:
  a first NN path to process the current picture;
  a second NN path comprising a first non-local residual block processing the current picture and a first auxiliary picture;
  a third NN path comprising a second non-local residual block processing the current picture and a second auxiliary picture; and
  generating the NN features output based on outputs from the first NN path, the second NN path, and the third NN path.

EEE 12. The method of EEE 11, wherein the features extraction network further comprises:
  a first concatenation block concatenating the output of the first NN path and the output of the second NN path;
  a convolutional sub-network comprising at least one convolutional block receiving an output of the first concatenation block;
  a second concatenation block concatenating an output of the convolutional sub-network and the output of the second NN path;
  a third concatenation block concatenating the output of the first concatenation block and an output of the second concatenation block; and
  an output convolutional block generating the NN features output given an output of the third concatenation block.

EEE 13. The method of EEE 12, wherein:
  the first NN path comprises a sequence of a convolutional block, a residual network block and a convolutional block providing the output of the first NN path, and
  the second and third NN paths each comprise, following the respective non-local residual block, a sequence of a convolutional block, a residual network block and a convolutional block providing the output of the respective NN path.

EEE 14. The method of any one of EEEs 12-13, wherein the convolutional sub-network comprises a residual network block followed by a convolutional block.

EEE 15. The method of any one of EEEs 11-14, wherein the features extraction network concatenates the current picture and the first auxiliary picture in a channel direction and then feeds the concatenated current and first auxiliary pictures to the second NN path, and wherein the features extraction network concatenates the current picture and the second auxiliary picture in a channel direction and then feeds the concatenated current and second auxiliary pictures to the third NN path.

EEE 16. The method of EEE 15, wherein each one of the current picture and the first and second auxiliary pictures have C channels and spatial dimensions W and H, and wherein the respective concatenated current and auxiliary pictures have 2*C channels and spatial dimensions W and H, wherein W and H denote width and height, respectively.

EEE 17. The method of EEE 16, wherein each non-local residual block comprises:
an input receiving the respective concatenated current and auxiliary picture, and following the input, a first path, a second path, a third path and a residual path, wherein the first path comprises a first reshaping block and outputs a first feature map, the second path comprises a first pooling layer (e.g. a first max pooling layer) and outputs a second feature map, and the third path comprises a sequence of a first convolution block and a second pooling layer (e.g. a second max pooling layer) and outputs a third feature map;
a first multiplier performing matrix multiplication of the first feature map and the second feature map and outputs a fourth feature map;
an activation function (e.g. softmax) processing the fourth feature map;
a second multiplier performing matrix multiplication of an output of the activation function and the third feature map and outputs a fifth feature map;
a sequence of a second reshaping block and a second convolution block processing the fifth feature map and outputting a sixth feature map; and
an adder performing element-wise addition of the sixth feature map and the input received via the residual path.

EEE 18. The method of EEE 17, wherein each non-local residual block further comprises, following the input and preceding the first, second and third paths, a sub-pixel convolution layer processing the respective concatenated current and auxiliary picture and feeding a reshaped input with $2*C*r^2$ channels and spatial dimensions W/r and H/r to each of the first, second and third paths, wherein r is an integer, such as r=2.

EEE 19. The method of EEE 18, wherein the first and second convolution blocks each comprise a filter bank of size A×B×1×1, where $A=B=2*C*r^2$.

EEE 20. The method of any one of EEEs 11-19, wherein the first auxiliary picture is prior to the current picture and the second auxiliary picture is subsequent to the current picture.

EEE 21. The method of any one of EEEs 11-20, wherein the first auxiliary picture, the current picture and the second auxiliary picture are consecutive pictures of the video sequence.

EEE 22. An apparatus comprising a processor and configured to perform any one of
the methods recited in EEEs 1-21.

EEE 23. A non-transitory computer-readable storage medium having stored thereon computer-executable instruction for executing a method with one or more processors in accordance with any one of the EEEs 1-21.

The invention claimed is:

1. A method for super-resolution of pictures in a video sequence:
receiving at a first spatial resolution a current picture (102) and auxiliary pictures (104), wherein the auxiliary pictures (104) comprise a first auxiliary picture (104-1) prior to or subsequent to the current picture (102) and a second auxiliary picture (104-2) prior to or subsequent to the current picture (102);
generating a neural network, NN, features output based on a features extraction neural network (105), the current picture (102) and the auxiliary pictures (104), wherein the features extraction network (105) comprises:
a first NN path processing the current picture (102);
a second NN path comprising a first non-local residual block (205) processing the current picture (102) and the first auxiliary picture (104-1);
a third NN path comprising a second non-local residual block (205) processing the current picture (102) and a second auxiliary picture (104-2); and
wherein the features extraction network (105) generates the NN features output by:
concatenating, by a first concatenation block, outputs from the first NN path and the second NN path,
processing, by a convolutional sub-network comprising at least one convolutional block, an output of the first concatenation block,
concatenating, by a second concatenation block, an output of the convolutional sub-network and the output of the third NN path, and
concatenating, by a third concatenation block, the output of the first concatenation block and an output of the second concatenation block, and
processing, by an output convolutional block, the output of the third concatenation block to generate the NN features output;
generating a NN upscaling output at a second spatial resolution based on the NN features output and an upscaling neural network (110);
generating a NN reconstruction output at the second spatial resolution based on the NN upscaling output and a reconstruction neural network (115);
upscaling the current picture with a first picture scaler to generate a first upscaled picture at the second spatial resolution; and
adding the first upscaled picture to the NN reconstruction output to generate a super-resolution picture at the second spatial resolution.

2. The method of claim 1, wherein:
the first NN path comprises a sequence of a convolutional block, a residual network block and a convolutional block providing the output of the first NN path, and
the second and third NN paths each comprise, following the respective non-local residual block, a sequence of a convolutional block, a residual network block and a convolutional block providing the output of the respective NN path.

3. The method of claim 1, wherein the convolutional sub-network comprises a residual network block followed by a convolutional block.

4. The method of claim 1, wherein the features extraction network (105) concatenates the current picture (102) and the first auxiliary picture (104-1) in a channel direction and then feeds the concatenated current and first auxiliary pictures to the second NN path, and wherein the features extraction network (105) concatenates the current picture (102) and the second auxiliary picture (104-2) in a channel direction and then feeds the concatenated current and second auxiliary pictures to the third NN path.

5. The method of claim 1, further comprising applying to the super-resolution picture a second spatial upscaling to generate a second super-resolution picture at a third spatial resolution.

6. The method of claim 5, wherein the second spatial upscaling comprises bicubic upscaling.

7. The method of claim 1, wherein the first picture scaler comprises bicubic upscaling.

8. The method of claim 1, wherein the first auxiliary picture (104-1) is prior to the current picture (102) and the second auxiliary picture (104-2) is subsequent to the current picture (102).

9. The method of claim 1, wherein the first auxiliary picture (104-1), the current picture (102) and the second auxiliary picture (104-2) are consecutive pictures of the video sequence.

10. The method of claim 1, wherein the auxiliary pictures comprise one or more pictures subsequent to the current picture and one or more pictures prior to the current picture.

11. The method of claim 1, wherein the current picture and the auxiliary pictures are HDR pictures coded using PQ in the ICtCp color space.

12. The method of claim 1, wherein the upscaling neural network comprises an input feeding into an input convolution block (CONV5) followed by a first Up Block and a first Down block, followed by a second Up Block and a second Down block, followed by a third Up Block, wherein outputs from all the Up Blocks are concatenated to generate an output which is fed to an output convolution block (CONV6) to generate an upscaled output of the input.

13. The method of claim 1, wherein the reconstruction neural network comprises a convolutional module.

14. An apparatus comprising a processor and configured to perform the method recited in claim 1.

15. A non-transitory computer-readable storage medium having stored thereon computer-executable instruction for executing a method with one or more processors in accordance with claim 1.

\* \* \* \* \*